United States Patent [19]
Tamura et al.

[11] Patent Number: 6,118,070
[45] Date of Patent: Sep. 12, 2000

[54] INSULATED CONDUCTOR PAIR AND A GUIDE CABLE USING THE SAME

[75] Inventors: Yoshihiro Tamura; Masao Sasagawa, both of Yokkaichi; Yoshio Tsuchizaki; Kyouji Mita, both of Osaka, all of Japan

[73] Assignee: Sumitomo Wiring Systems, Ltd., Japan

[21] Appl. No.: 08/950,872

[22] Filed: Oct. 15, 1997

[30] Foreign Application Priority Data

Oct. 31, 1996 [JP] Japan ................................. 8-290930

[51] Int. Cl.[7] ................................................. H01B 07/34
[52] U.S. Cl. .................................................... 174/36
[58] Field of Search .............................. 174/32, 33, 34, 174/36

[56] References Cited

U.S. PATENT DOCUMENTS 5,126,666  6/1992  Van Heyningen ..................... 324/244
5,397,862  3/1995  Bockelman et al. ................... 174/250

FOREIGN PATENT DOCUMENTS 3-11693  2/1991  Japan .

*Primary Examiner*—Kristine Kincaid
*Assistant Examiner*—William H Mayo, III
*Attorney, Agent, or Firm*—Anthony J. Casella; Gerald E. Hespos; Ludomir A. Budzyn

[57] ABSTRACT

A layered insulated conductor pair is provided which can be easily manufactured in inexpensive facilities and with which a highly precise and stable degree of electromagnetic coupling can be obtained. A guide cable also is provided using such a layered insulated conductor pair. The layered insulated conductor pair 10A of one embodiment includes a plurality of film-shaped insulators 13, 13' placed one over another, and each insulator has line conductors 11, 11' of specified shape fixed to its front surface or its inside. The layered insulated conductor pair 10B of a second embodiment includes a single film-shaped insulator having line conductors 11, 11' of specified shape fixed to its front surface or its inside. The layered insulated conductor pair 10C of a third embodiment includes electromagnetic screening layers 20 arranged at intervals in close contact with the conductors 11, 11'. A guide cable includes one or more layered insulated conductor pairs 10A to 10C which are formed into a single piece and are surrounded by an outer coating 18.

14 Claims, 5 Drawing Sheets

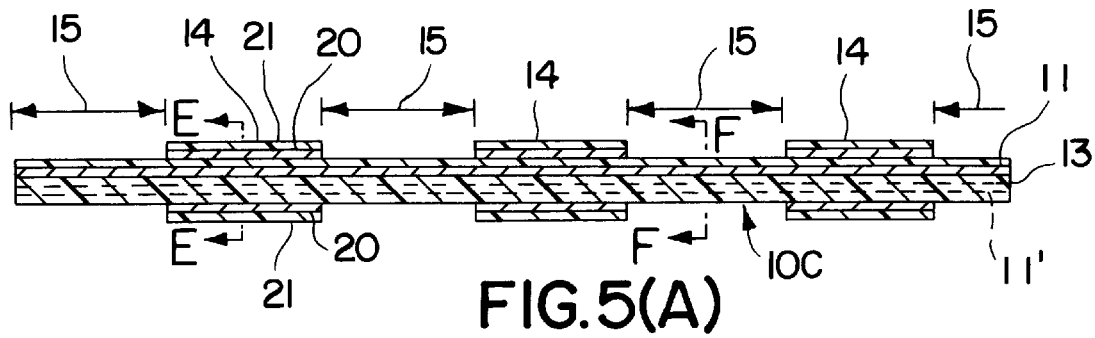
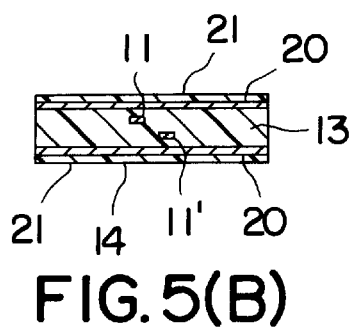
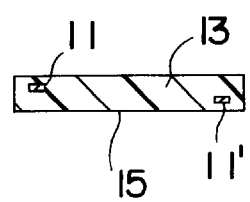
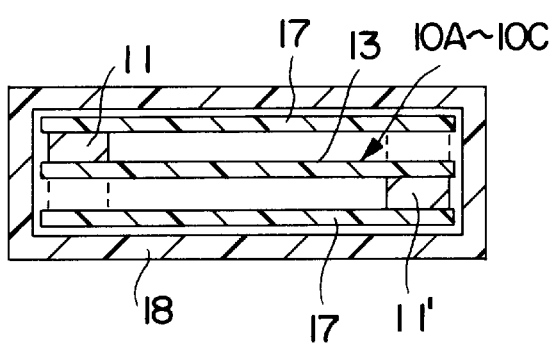
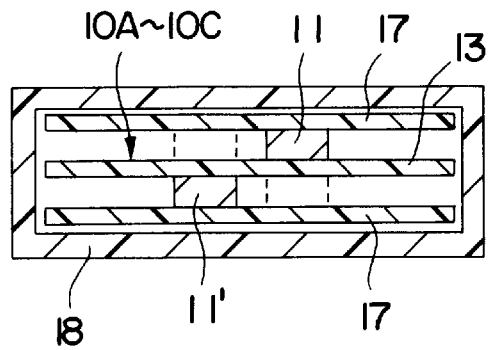

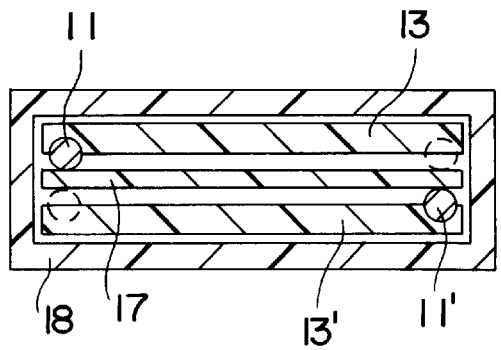
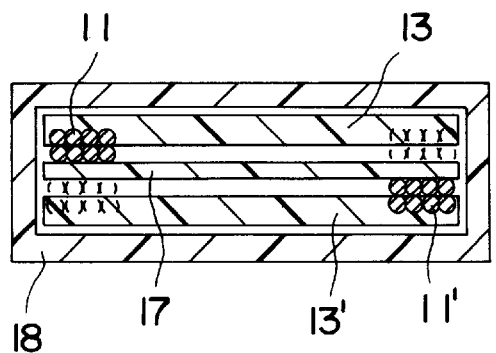
FIG. 7(A)   FIG. 7(B)
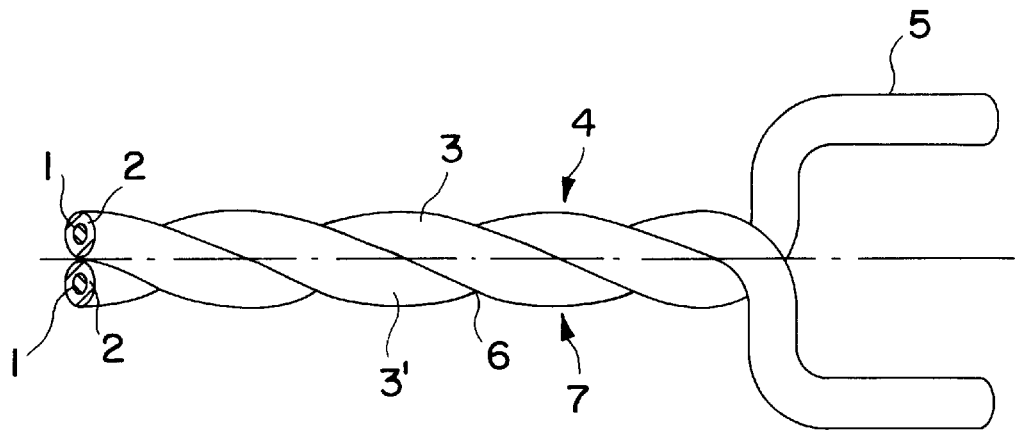
FIG. 8
PRIOR ART

INSULATED CONDUCTOR PAIR AND A GUIDE CABLE USING THE SAME

BACKGROUND OF THE INVENTION

1. Field of the Invention

The present invention relates to an insulated conductor pair and a guide cable using the same.

2. Description of the Prior Art

Communication between a movable body such as a vehicle moving along a railway track or road, and a ground station conventionally employs a so-called guide or leaky cable that is laid along the track or road. Bidirectional communication is effected to transmit and receive information by coupling an electromagnetic field leaking in a suitable degree from this guide cable with an antenna provided on the movable body.

As another application, an electromagnetic field may be caused to leak intermittently from the guide cable rather than continuously. Distances between the positions where the electromagnetic field leaks and the ground station may be accurately measured and gauged. Then, the position of the movable body from the ground station can be monitored accurately based on the reaction of the movable body to a signal transmitted from the ground station or based on a phase difference of a signal transmitted from the movable body and received by the ground station via the guide cable. Because of the above application, the guide cable is also called a movable body position detecting guide cable.

The above guide cable is, as shown in FIG. 8, formed such that two insulated wires 3, 3' each comprised of a conductor 1 and an insulating coating 2 are twisted in one direction to form an insulated wire pair 4. Electromagnetic field coupling portions (opened portions) 5, where the insulated wires 3, 3' are spaced from each other in parallel, are formed at intervals along the length of the insulated wire pair 4. The thus formed guide cable 7 is usually called a twisted pair type guide cable.

As shown in FIGS. 9(A) and 9(B), the guide cable 7 is constructed such that a guide pair formed by the insulated wire pair 4 arranged on a base plate 8 is pressingly taped together with an interposition member for holding the configuration of the guide pair and for protecting the guide pair against an external force. The taped guide pair is further surrounded by an outer coating made of a nonmetallic and nonmagnetic (for an efficient leakage of an electromagnetic field) synthetic resin such as polyolefin or vinyl chloride.

Portions of the guide cable 7 at the opposite sides of the electromagnetic field coupling portions 5 where the insulated wires 3, 3' are twisted are electromagnetic field uncoupling portions 6, which have a property of leaking an electromagnetic field in a very small degree as compared with the electromagnetic coupling portions 5 by the twist effect of the insulated wires 3, 3'.

Accordingly, as shown in FIG. 10, when an antenna 9 of the movable body moves along the guide cable 7, an antenna coupling output becomes larger when the antenna 9 approaches the electromagnetic field coupling portion 5 while becoming smaller when the antenna 5 approaches the electromagnetic field uncoupling portion 6.

Facilities for manufacturing the insulated wire pair 4 of the guide cable 7 are usually as follows. Reels on which the insulated wires 3, 3' are wound up are mounted on a rotary feeding apparatus. The insulated wires 3, 3' let out from the respective reels are guided by wire guides to a twisting die while the rotary feeding apparatus and the respective reels are rotated. The insulated wire pair 4 is withdrawn from the twisting die by being held between belts of a withdrawing apparatus while stopping the rotation. In this way, the insulated wire pair 4 twisted in one direction is formed and taken up by a drum of a take-up apparatus.

The insulated wire pair 4 taken up by the drum of the take-up apparatus is let out from this drum by a suitable length, and the insulated wires 3, 3' are untwisted at intervals along the length of the insulated wire pair 4 and arranged in parallel. By widening the spacing between the untwisted portions of the insulated wires 3, 3' in parallel with each other, the electromagnetic field coupling portion 5 is provided.

However, the conventional twisted pair type guide cable 7 using the insulated wire pair 4 requires large manufacturing facilities since two insulated wires 3, 3' are twisted to manufacture the insulated wire pair 4. Further, to improve the accuracy of twisting intervals of the insulated wires 3, 3', which directly influences the antenna coupling output, the manufacturing facilities need to be controlled with high precision. Accordingly, there are problems of the large facilities and high running costs.

An operation of providing the electromagnetic field coupling portions 5 by: untwisting the insulated wires 3, 3' at intervals along the length of the insulated wire pair 4, arranging the untwisted portions in parallel, and widening the spacing between the untwisted portions in parallel with each other is a very difficult operation which still requires a lots of time and labor despite the use of large-scaled machines and tools. It is also difficult to accurately space the insulated wires 3, 3' in parallel with each other in the electromagnetic field coupling portions 5, and the insulated wires 3, 3' are nonuniformly twisted and arranged in boundary portions between the electromagnetic field coupling portions 5 and the electromagnetic field uncoupling portions 6. As a result, a highly precise and stable degree of electromagnetic coupling is unlikely to be obtained.

Particularly, since the twisted insulated wire pair 4 has a circular cross section and is likely to rotate about its axis, the twisting intervals may vary due to the rotation of the insulated wire pair 4 about its axis upon being subjected to an external force while the insulated wire pair 4 is assembled into the guide cable.

Further, since the insulated wires 3, 3' having a circular cross section are used, the guide cable 7 has a large thickness (height). Accordingly, such a guide cable 7 cannot be laid in a place which needs to be thin, such as a floor surface, a wall surface or a narrow cable passage portion. Additionally, it is not possible to completely eliminate the leakage of the electromagnetic field by electromagnetically screening only portions corresponding to the electromagnetic uncoupling portions 6 of the guide cable 7.

The present invention was developed in view of the above problems, and an object thereof is to provide an insulated conductor pair which can be manufactured easily in inexpensive facilities and with which a highly precise and stable degree of electromagnetic coupling can be obtained. An object of the invention also is to provide a guide cable using such an insulated conductor pair.

SUMMARY OF THE INVENTION

According to the invention, there is provided an insulated conductor pair, wherein the insulated conductor pair is layered and comprises at least one film-shaped insulator having one or more line conductors of specified shape fixed to its surface or its inside or embedded therein.

According to another aspect of the invention, there is provided a layered insulated conductor pair, characterized by comprising a plurality of film-shaped insulators placed one over another, each insulator having line conductors of specified shape fixed to its front surface or its inside.

With the above construction, unlike the prior art insulated wire pair in which insulated wires are twisted, the line conductors need not be twisted in the layered insulated conductor pair, thereby obviating the need for large-scaled manufacturing facilities and for a control apparatus for highly precisely controlling the manufacturing facilities.

Further, unlike the prior art insulated wire pair, a difficult operation of untwisting the portions of the insulated wires and spacing the untwisted portions in parallel with each other to provide the electromagnetic field coupling portions is not necessary. Further, since the line conductors can be fixed easily and accurately by, for example, being adhered to the film-shaped insulators, the line conductors can be more precisely spaced in parallel with each other in the electromagnetic field coupling portions and the boundary portions between the electromagnetic field coupling portions and the electromagnetic field uncoupling portions easily can be made uniform. Thus, a highly precise and stable degree of electromagnetic coupling can be obtained.

Further, unlike the prior art insulated wire pair, the layered insulated conductor pair neither rotates about its axis nor requires twisting. Thus a variation of a degree of electromagnetic coupling caused by a variation of twisting intervals is small.

Although the above layered insulated conductor pair is such that a plurality of film-shaped insulators are placed one over another, the same effects can be obtained even with the layered construction in which the line conductors are fixed to the opposite surfaces of one insulator.

According to a further aspect of the invention, there is provided a layered insulated conductor pair, comprising a film-shaped insulator having line conductors of specified shape fixed to a front surface or an inside.

Accordingly the layered insulated conductor pair has a simple, but precisely dimensioned construction in which the line conductors are fixed to the opposite sides of one insulator.

Preferably, each conductor comprises a plurality of divided or separated conductors, that preferably are arranged in a rectangular or circular overall or outer cross section. Accordingly, the conductors can be thinned and easily bent as compared with the single large conductor.

Further preferably the spacing of the pair of conductors is varied at intervals along a longitudinal direction. Accordingly, the electromagnetic field coupling portions and the electromagnetic field uncoupling portions can be formed easily in the line conductors.

Most preferably, electromagnetic screening layers are arranged at intervals preferably in close contact with the conductors in the layered insulated conductor pair. Accordingly, when they are arranged particularly on the electromagnetic field uncoupling portions, the leakage of the electromagnetic field therefrom is prevented, making a greater difference between a degree of electromagnetic coupling between the electromagnetic field coupling portions and an antenna and the one between the electromagnetic field uncoupling portions and the antenna.

According to a further preferred embodiment, the line conductors are arranged such that first portions thereof are arranged along a substantially trapezoidal wave path having preferably a long cycle and second portions thereof are arranged along a sinuous path similar to a sine wave having preferably short cycles.

Preferably, the line conductors have a substantially circular or rectangular cross section.

According to the invention, there is further provided a guide cable being formed using one or more layered insulated conductor pairs according to the invention, which are integrally or unitarily formed or are formed into a single piece and are preferably surrounded by an outer coating. Accordingly, it can be thinned as compared with a guide cable using the prior art insulated wire pair. As a result, such a guide cable can be laid in a floor surface or like place where the thickness is desired to be reduced.

According to a preferred embodiment, the first portions of the line conductors correspond to an electromagnetic field coupling portion and wherein the second portions thereof correspond to an electromagnetic field uncoupling portion.

Preferably, the electromagnetic screening layers are arranged at intervals preferably in close contact with the outer coating in the guide cable. Accordingly, even if they are not arranged in close contact with the conductors, the portions of the line conductors corresponding to the electromagnetic uncoupling portions can be electromagnetically screened to completely prevent the leakage of the electromagnetic field. Accordingly, a difference between a degree of electromagnetic coupling between the electromagnetic field coupling portions and the antenna and the one between the electromagnetic field uncoupling portions and the antenna can be made larger. In other words, the portions of the line conductors corresponding to the electromagnetic uncoupling portions can be electromagnetically screened to completely prevent the leakage of the electromagnetic field.

These and other objects, features and advantages of the present invention will become more apparent upon a reading of the following detailed description and accompanying drawings.

BRIEF DESCRIPTION OF THE DRAWINGS

FIGS. 1(A) to 1(C) show a layered insulated conductor pair according to a first embodiment of the invention, wherein FIG. 1(A) is a front view, FIG. 1(B) is a section along A—A of FIG. 1(A) and FIG. 1(C) is a section along B—B of FIG. 1(A).

FIGS. 2(A) and 2(B) show two conductors of a layered insulated conductor pair according to a second embodiment, wherein FIG. 2(A) is a front view of one conductor and FIG. 2(B) is a front view of the other conductor.

FIGS. 3 (A) to 3(C) show the layered insulated conductor pair according to the second embodiment, wherein

FIGS. 5(A) to 5(C) show the layered insulated conductor pair according to the third embodiment, wherein FIG. 5(A) is a section, FIG. 5(B) is a section along E—E of FIG. 5(A) and FIG. 5(C) is a section along F—F of FIG. 5(A).

FIGS. 6(A) and 6(B) are sections showing a first embodiment of a guide cable.

FIG. 7(A) is a section showing a second embodiment of a guide cable, and FIG. 7(B) is a section showing a third embodiment of the guide cable.

FIG. 8 is a front view of a prior art insulated wire pair.

DETAILED DESCRIPTION OF THE PREFERRED EMBODIMENT

Figure 1A:
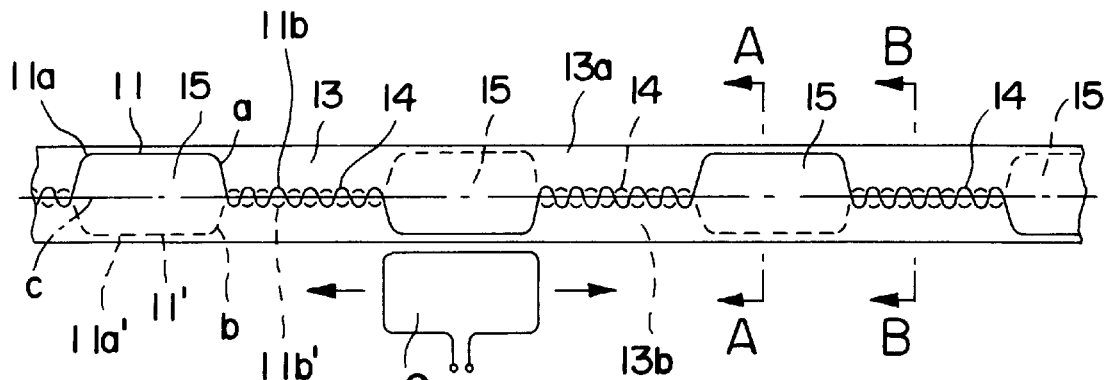
Figure 1B:
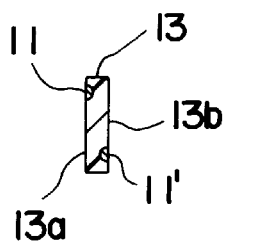
Figure 1C:
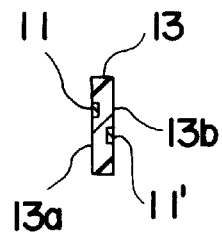

FIGS. 1(A) to 1(C) show a layered insulated conductor pair 10A according to a first embodiment. Line conductors 11, 11' indicated by solid line a and broken line b as shown in FIG. 1(A) are leafs having a substantially rectangular cross section as shown in FIGS. 1(B) and 1(C). These line conductors 11, 11' are arranged fixedly on a front surface 13a and a rear surface 13b of an insulator 13 e.g. in the form of a thin film in a specifically sinuous manner, respectively.

Figure 2A:
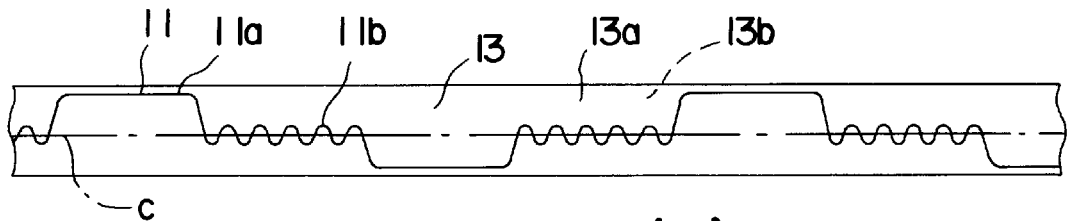

Specifically, with reference to FIG. 2(A) showing a second embodiment, portions 11a of the line conductor 11 corresponding to electromagnetic field coupling portions 15 preferably are arranged fixedly on the front surface 13a of the insulator 13 along a substantially trapezoidal wave path having a long cycle, whereas portions 11b of the line conductor 11 corresponding to electromagnetic field uncoupling portions 14 are preferably fixedly arranged on the front surface 13a along a sinuous path similar to a sine wave having short cycles.

Figure 2B:
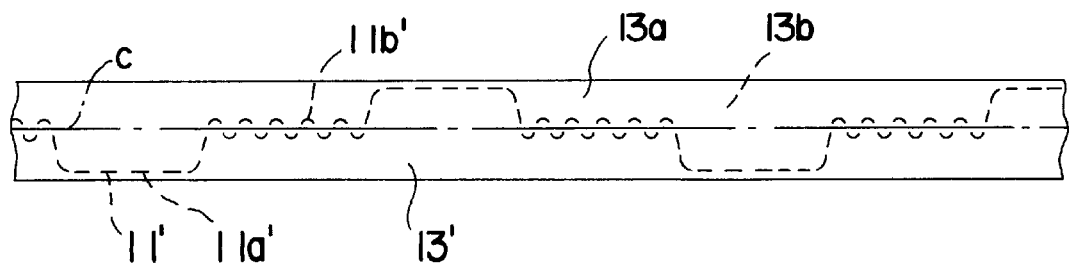

Similarly, with reference to FIG. 2(B), portions 11a' of the line conductor 11' corresponding to electromagnetic field coupling portions 15 are arranged fixedly on the rear surface 13b of the insulator 13 along a trapezoidal wave path having a long cycle, whereas portions 11b' of the line conductor 11' corresponding to electromagnetic field uncoupling portions 14 are arranged fixedly on the rear surface 13b along a sinuous path similar to a sine wave having short cycles.

The respective portions 11a, 11b, 11a', 11b' of the line conductors 11, 11' are arranged on the front and rear surfaces 13a, 13b of the insulator 13 such that their phases are inverted symmetrically with respect to a center line c.

The line conductors 11, 11' are imbedded in the front and rear surfaces 13a, 13b of the insulator 13 by insert molding. However, they may be adhered to the front and rear surfaces 13a, 13b by adhesive.

Figure 9A:
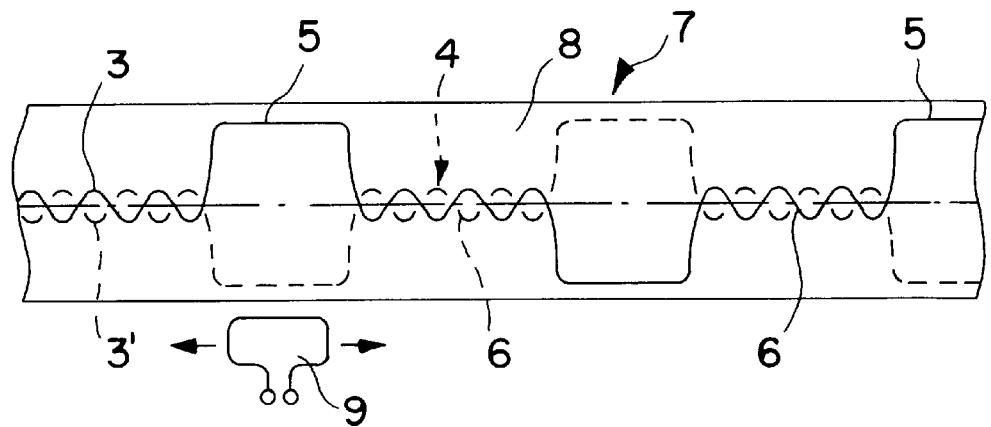
FIGS. 9(A) and 9(B) are a front view and a section showing the prior art insulated wire pair.
Figure 9B:
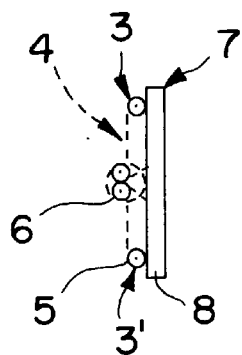
Figure 10:
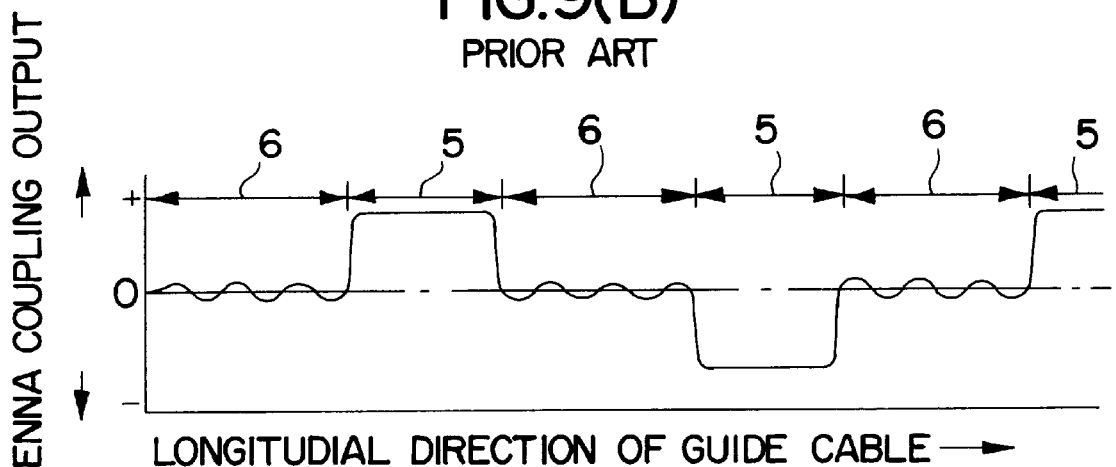
FIG. 10 is a graph showing an antenna coupling output along the longitudinal direction of the guide cable.

The planar portions 11a, 11b, 11a', 11b' of the line conductors 11, 11' are fixed to the front and rear surfaces 13a, 13b of the insulator 13, and are not twisted as in the prior art insulated wire pair 4 using the insulated wires 3, 3', shown in FIGS. 8 and 9.

The layered insulated conductor pair 10A according to the first embodiment, when viewed in a direction perpendicular to the plane of the film-shaped insulator 13, is similar to the prior art guide cable using the insulated wire pair 4, in that the electromagnetic field coupling portions 15, where the conductors are spaced in parallel, are provided at intervals along the length of the insulated conductor pair 10A, and the electromagnetic uncoupling portions 14 are provided between adjacent electromagnetic coupling portions 15.

The portions 11b, 11b' of the line conductors 11, 11' are not twisted in the electromagnetic field uncoupling portions 14, and therefore are unlike the insulated wires 3, 3' in the electromagnetic uncoupling portions 6 of the prior art insulated wire pair 4. However, the portions 11b, 11b' are arranged along a sinuous path similar to the sine wave having short cycles and are overlapped very close to each other. Accordingly, the electromagnetic field leaks in a small degree in a direction perpendicular to the thickness direction of the overlapped portions 11b, 11b'. Similar to the prior art electromagnetic uncoupling portions 6, the electromagnetic uncoupling portions 14 have a property of leaking the electromagnetic field in a very small degree.

Figure 3A:
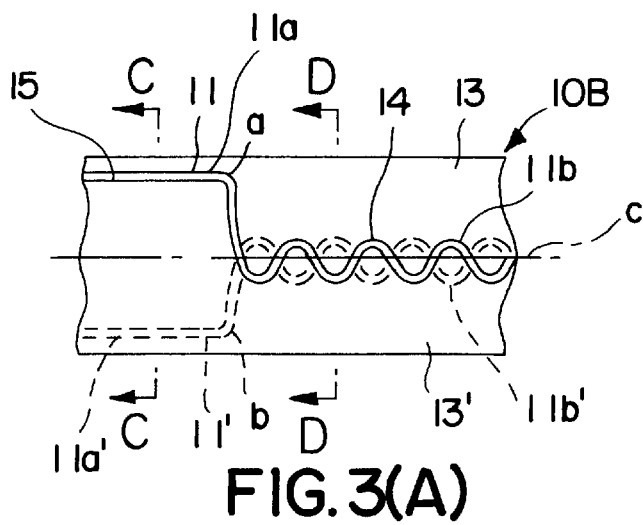
FIG. 3(A) is a front view.
Figure 3B:
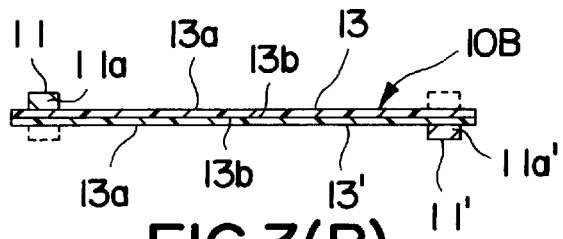
FIG. 3(B) is a section along C—C of FIG. 3(A) and FIG. 3(C) is a section along D—D of FIG. 3(A).
Figure 3C:
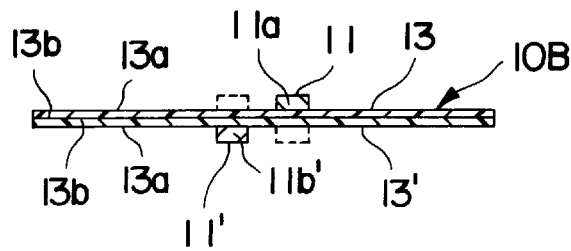

FIGS. 2 and 3 show a layered insulated conductor pair 10B according to the second embodiment. In this embodiment, line conductors 11, 11' indicated by solid line a and broken line b in FIG. 3(A) are leafs having a rectangular cross section as shown in FIGS. 3(B) and 3(C). These line conductors 11, 11' are arranged fixedly on a front surface 13a and a rear surface 13b of an insulator 13 and an insulator 13' in the form of a thin film in a specifically sinuous manner, respectively.

Specifically, as shown in FIG. 2(A), portions 11a of the line conductor 11 corresponding to electromagnetic field coupling portions 15 are arranged fixedly on the front surface 13a of the insulator 13 along a trapezoidal wave path having a long cycle, whereas portions 11b of the line conductor 11 corresponding to electromagnetic field uncoupling portions 14 are arranged fixedly on the front surface 13a along a sinuous path similar to a sine wave having short cycles.

Similarly, as shown in FIG. 2(B), portions 11a' of the line conductor 11' corresponding to electromagnetic field coupling portions 15 are fixedly arranged on the rear surface 13b of the insulator 13' along a trapezoidal wave path having a long cycle, whereas portions 11b' of the line conductor 11' corresponding to electromagnetic field uncoupling portions 14 are arranged fixedly on the rear surface 13b along a sinuous path similar to a sine wave having short cycles.

The respective portions 11a, 11b, 11a', 11b' of the line conductors 11, 11' are arranged on the front surface 13a of the insulator 13 and the rear surface 13b of the insulator 13' such that their phases are inverted symmetrically with respect to a center line c.

The respective line conductors 11, 11' are fixed or adhered to the front and rear surfaces 13a, 13b of the respective insulators 13, 13' by adhesive or the like. Alternatively, the line conductors 11, 11' may be fixed or adhered to the front and rear surfaces 13a, 13b of one insulator 13 by adhesive or the like.

The insulators 13, 13' are adhered to each other by adhering the rear surface 13b of the insulator 13 and the front surface 13a of the insulator 13' by adhesive or the like so as to form a single piece insulator.

The planar portions 11a, 11b, 11a' and 11b' of the line conductors 11, 11' are fixed to the front surface 13a and the rear surface 13b of the insulators 13, 13', and are not twisted, as had been the case with the prior art insulated wire pair 4 using the insulated wires 3, 3'.

The layered insulated conductor pair 10B according to the second embodiment, when the insulators 13, 13' are viewed in a direction perpendicular thereto, is similar to the prior art guide cable using the insulated wire pair 4, in that the electromagnetic field coupling portions 15, where the conductors are spaced in parallel, are provided at intervals along the length of the insulated conductor pair 10B, and the electromagnetic uncoupling portions 14 are provided between adjacent electromagnetic coupling portions 15.

The portions 11b, 11b' of the line conductors 11, 11' are not twisted in the electromagnetic field uncoupling portions 14, and therefore are unlike the insulated wires 3, 3' in the electromagnetic uncoupling portions 6 of the prior art insulated wire pair 4. However, the portions 11b, 11b' arranged along a sinuous path similar to the sine wave having short cycles are overlapped very close to each other. Accordingly, similar to the prior art electromagnetic uncoupling portions 6, the electromagnetic field uncoupling portions 14 have a property of leaking the electromagnetic field in a very small degree.

Figure 4:
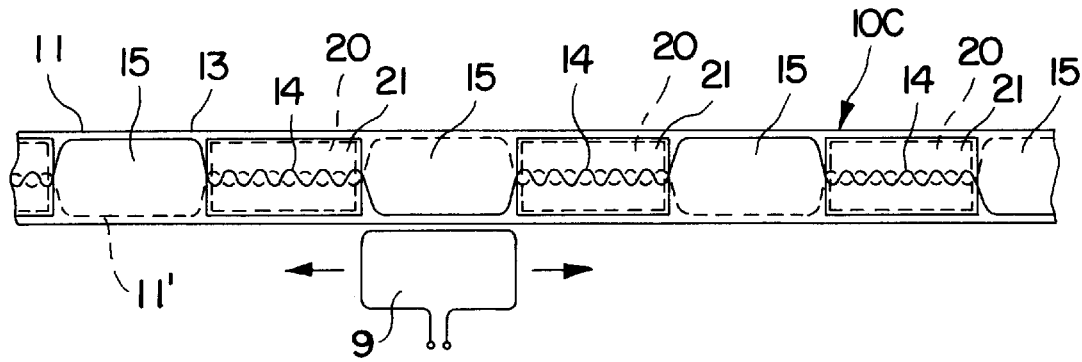
FIG. 4 is a front view of a layered insulated conductor pair according to a third embodiment.

FIGS. 4 and 5 show a layered insulated conductor pair 10C, according to a third embodiment. The layered insulated conductor pair 10C, according to this embodiment, is basically constructed such that a difference between a degree of electromagnetic coupling between electromagnetic field coupling portions 15 and an antenna 9 and the one between electromagnetic field uncoupling portions 14 and the antenna 9 can be made larger, i.e. a difference between a coupling signal S of the electromagnetic field coupling portions 15 and a fine coupling signal (noise) N of the electromagnetic field uncoupling field 14 can be made larger using the layered insulated conductor pairs 10A, 10B according to the first and second embodiments.

More specifically, electromagnetic screening layers 20 made of a conductive or magnetic material or a composite of these materials are so arranged as to surround the respective electromagnetic field uncoupling portions 14 of the layered insulated conductor pair 10C or to be in sealable contact with the opposite surfaces of the electromagnetic filed uncoupling portions 14. In this way, the leakage of the electromagnetic field from the respective electromagnetic field uncoupling portions 14 to the outside is further prevented.

If necessary, insulating or reinforcing layers 21 may be arranged on or fixed to the outer surfaces of the respective electromagnetic screening layers 20.

Although the respective electromagnetic field coupling portions 15 are not provided with the electromagnetic screening layers 20 because of their purpose, in the case that a plurality of layered insulated conductor layers are placed one over another, the layers 20 may be provided in such a manner that the coupling of the electromagnetic field coupling portions 15 of one layered insulated conductor pair with the antenna 9 does not interfere with the layers 20 of the other layered insulated conductor pair(s). In such a case, the layers 20 need to have such size and configuration as not to cause the above interference.

FIGS. 6(A) and 6(B) are sections, corresponding to the FIGS. 3(A) and 3(B), showing an embodiment of a cable formed using the respective layered insulated conductor pairs 10A to 10C. It should be noted that a similar construction is adopted in the case that two or more layered insulated conductor pairs are formed into a single piece.

Protection layers 17 are arranged on the opposite surfaces of the layered insulated conductor pairs 10A to 10C, and such an assembly is surrounded by an outer coating 18.

The electromagnetic screening layers 20 may be arranged on the outer coating 18 instead of being arranged on the electromagnetic uncoupling portions 14 and the like as in the third embodiment.

Although the line conductors 11, 11' are leafs having a rectangular or square cross section in the respective foregoing embodiments, they may be each a conductor having a single circular cross section as shown in FIG. 7(A). If the line conductors 11, 11' are each a conductor having a single circular cross section, they are easily and precisely bendable in a sinuous manner and connector terminals are easily connectable with the opposite ends thereof.

Further, as shown in FIG. 7(B), the line conductors 11, 11' may be each comprised of a plurality conductors having a small circular cross section.

If the line conductors 11, 11' each are comprised of a plurality of conductors having a small circular cross section, the thickness thereof can be reduced by eliminating an unnecessary space, and the rigidity of the line conductors 11, 11' as a layered insulated conductor pair against bending becomes smaller, with the result that the line conductors 11, 11' can be bent easily and precisely in a sinuous manner. The resistance of the line conductors 11, 11' against bend fatigue fracture caused by vibration while they are used is also improved.

What is claimed is:

1. An insulated conductor pair comprising an elongated film-shaped insulator having first and second opposite surfaces and a center line, first and second line conductors fixed respectively In proximity to the first and second opposite surfaces of the film-shaped insulator, each of the first and second line conductors being arranged to define a trapezoidal wave pattern comprising a plurality of spaced trapezoidal waves, each of said trapezoidal waves having a selected cycle length, each of the first and second line conductors further being arranged to define a substantially sinuous wave pattern comprising a plurality of arrays of sinuous waves extending between the spaced trapezoidal waves, each of said sinuous wave having a cycle length substantially shorter than the cycle length of the trapezoidal waves, the first and second line conductors being fixed to the insulator such that respective phases of the first and second line conductors are Inverted symmetrically about the center line of the insulator, said insulated conductor pair further comprising electromagnetic screening layers arranged at intervals in close contact with the respective first and second line conductors.

2. An insulated conductor pair according to claim 1, wherein the film-shaped insulator comprises first and second film-shaped insulators placed one over another, the first insulator having the first surface thereon, and having the first line conductor fixed thereto and the second insulator having the second surface and having the second line conductor affixed thereto.

3. An insulated conductor pair according to claim 1, wherein said first and second line conductor comprises a plurality of separate conductors.

4. An insulated conductor pair according to claim 1, wherein the said first and second line conductors have a substantially rectangular cross section.

5. An insulated conductor pair according to claim 1, wherein the said first and second line conductors have a substantially circular cross section.

6. An insulated conductor pair according to claim 1, wherein the electromagnetic screening layers are aligned respectively with portions of the first and second line conductors that define the sinuous wave pattern.

7. An insulated conductor pair according to claim 1, wherein the first and second line conductors are fixed in proximity to the first and second opposite surfaces of the film-shaped insulator by adhering the first and second line conductors to the first and second opposite surfaces of the film-shaped insulators.

8. An insulated conductor pair as in claim 1, wherein the first and second line conductors are embedded at least partly in the film-shaped insulator in proximity to the first and second opposite surfaces thereof.

9. An insulated conductor pair according to claim 1, further comprising protection layers secured over the first and second line conductors.

10. A guide cable comprising an elongate film-shaped insulator having a center line and having first and second substantially parallel surfaces, a first line conductor fixed to the film-shaped insulator and disposed closer to the first parallel surface of the film-shaped insulator than to the second parallel surface thereof, a second line conductor separated from the first line conductor by the film-shaped insulator, said second line conductor being disposed closer to the second parallel surface of the film-shaped insulator than to the first parallel surface thereof, the first and second line conductors each comprising a plurality of spaced apart electromagnetic field coupling portions and a plurality of spaced apart electromagnetic field uncoupling portions disposed respectively between the electromagnetic field coupling portions, the field coupling portions of each said line conductor defining substantially trapezoidal waves and being disposed such that each of said trapezoidal waves of the first line conductor is inverted symmetrically about the center line of the film-shaped insulator relative to a corresponding one of the trapezoidal waves of the second line conductor, the electromagnetic field uncoupling portions of each said first and second line conductors defining arrays of generally sinuous waves having cycles shorter than the trapezoidal wave pattern, the sinuous wave pattern defining the electromagnetic field uncoupling portions of the first line conductor being inverted symmetrically about the center line of the film-shaped insulator relative to the sinuous wave pattern defining the electromagnetic field uncoupling portions of the second line conductor, said guide cable further comprising a plurality of spaced apart electromagnetic screening layers covering the respective electromagnetic field uncoupling portions and being substantially spaced from the respective electromagnetic field coupling portions.

11. A guide cable according to claim 10, wherein the first and second line conductors are parallel respectively to the first and second parallel surfaces of the film-shaped insulator.

12. A guide cable according to claim 10, further comprising an outer coating substantially surrounding the film-shaped insulator and the first and second line conductors.

13. A guide cable according to claim 10, wherein each of said first and second line conductors is of substantially rectangular cross-section.

14. A guide cable according to claim 13, wherein each of said first and second line conductors comprises a plurality of separate conductors.

* * * * *